US010382418B1

(12) United States Patent
Bar-Menachem et al.

(10) Patent No.: US 10,382,418 B1
(45) Date of Patent: Aug. 13, 2019

(54) AUTHENTICATION SYSTEMS WITH SELECTIVE AUTHENTICATION METHOD

(71) Applicant: EMC Corporation, Hopkinton, MA (US)

(72) Inventors: Ika Bar-Menachem, Herzelia (IL); Maya Herskovic, Tel Aviv (IL); Oren Menes, Raanana (IL); Marcelo Blatt, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 375 days.

(21) Appl. No.: 14/870,506

(22) Filed: Sep. 30, 2015

(51) Int. Cl.
*H04L 29/06* (2006.01)
(52) U.S. Cl.
CPC .................... *H04L 63/08* (2013.01)
(58) Field of Classification Search
CPC ........................................................ G06F 21/31
USPC ............................................................ 726/7
See application file for complete search history.

(56) References Cited

U.S. PATENT DOCUMENTS

| | | | | |
|---|---|---|---|---|
| 9,160,726 | B1* | 10/2015 | Kaufman | H04L 63/08 |
| 2014/0172707 | A1* | 6/2014 | Kuntagod | G06Q 20/40145 |
| | | | | 705/44 |
| 2015/0200971 | A1* | 7/2015 | Nishizawa | G06F 21/604 |
| | | | | 726/1 |
| 2016/0055324 | A1* | 2/2016 | Agarwal | G06F 21/31 |
| | | | | 726/17 |

* cited by examiner

*Primary Examiner* — Kambiz Zand
*Assistant Examiner* — Aubrey H Wyszynski
(74) *Attorney, Agent, or Firm* — Krishnendu Gupta; Lesley Leonessa

(57) ABSTRACT

There is disclosed a technique for use in authentication. The technique comprises receiving an authentication request. The technique also comprises evaluating an attribute associated with the implementation of the authentication request. The attribute is evaluated with respect to at least one available authentication method. The technique also comprises selecting an available authentication method suitable for use in authentication based on the said evaluation.

18 Claims, 5 Drawing Sheets

AUTHENTICATION SYSTEMS WITH SELECTIVE AUTHENTICATION METHOD

TECHNICAL FIELD

The present invention relates generally to techniques for detecting fraud in network communication systems.

BACKGROUND OF THE INVENTION

Authentication systems aim to identify fraudulent users even though such users possess credentials to gain access to a legitimate user's account information. For example, each login attempt is received at a service provider at a particular time and in many cases, a fraudulent user will send login attempts at times outside of those expected by a service provider. Existing adaptive authentication techniques compare information associated with a login attempt, such as the time of the login and a location from where the login originated, with a historical record of a typical user who exhibits some expected login behavior. For example, if a high percentage of prior login attempts received by the service provider from a particular user occur between the hours of 6 AM and 11 PM daily and from locations within the continental United States, then login attempts between 2 AM and 4 AM from locations across Eastern Europe, have a high risk of being a fraudulent user.

The need for improved and comprehensive authentication systems is rising every day, for example, due to the increase in cybercrime and fraud. Many adaptive authentication systems employ a number of different authentication methods. Authentication methods include, for example, simple passwords, one-time passcodes, biometrics, tokens and certificates. Each authentication method varies by the strength of the method, the addressed authentication factors, and the usability and cost of the method. Existing authentication systems select one or more suitable authentication methods based on the sensitivity and risk of the activity, taking into account usability and cost constraints.

The problem, however, with the existing approaches is that the selection of the authentication methods is static. A need, therefore, exists for improved techniques for selecting a suitable authentication method for a given transaction from among a plurality of available authentication methods.

SUMMARY OF THE INVENTION

There is disclosed a method, comprising: receiving an authentication request; evaluating an attribute associated with the implementation of the authentication request, wherein the attribute is evaluated with respect to at least one available authentication method; and based on the said evaluation, selecting an available authentication method suitable for use in authentication.

There is an apparatus, comprising: a memory; and at least one hardware device, coupled to the memory, operative to: receive an authentication request; evaluate an attribute associated with the implementation of the authentication request, wherein the attribute is evaluated with respect to at least one available authentication method; and based on the said evaluation, select an available authentication method suitable for use in authentication.

There is a computer program product comprising a tangible machine-readable storage medium having encoded therein executable code of one or more software programs, wherein the one or more software programs when executed perform the steps of: receiving an authentication request; evaluating an attribute associated with the implementation of the authentication request, wherein the attribute is evaluated with respect to at least one available authentication method; and based on the said evaluation, selecting an available authentication method suitable for use in authentication.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
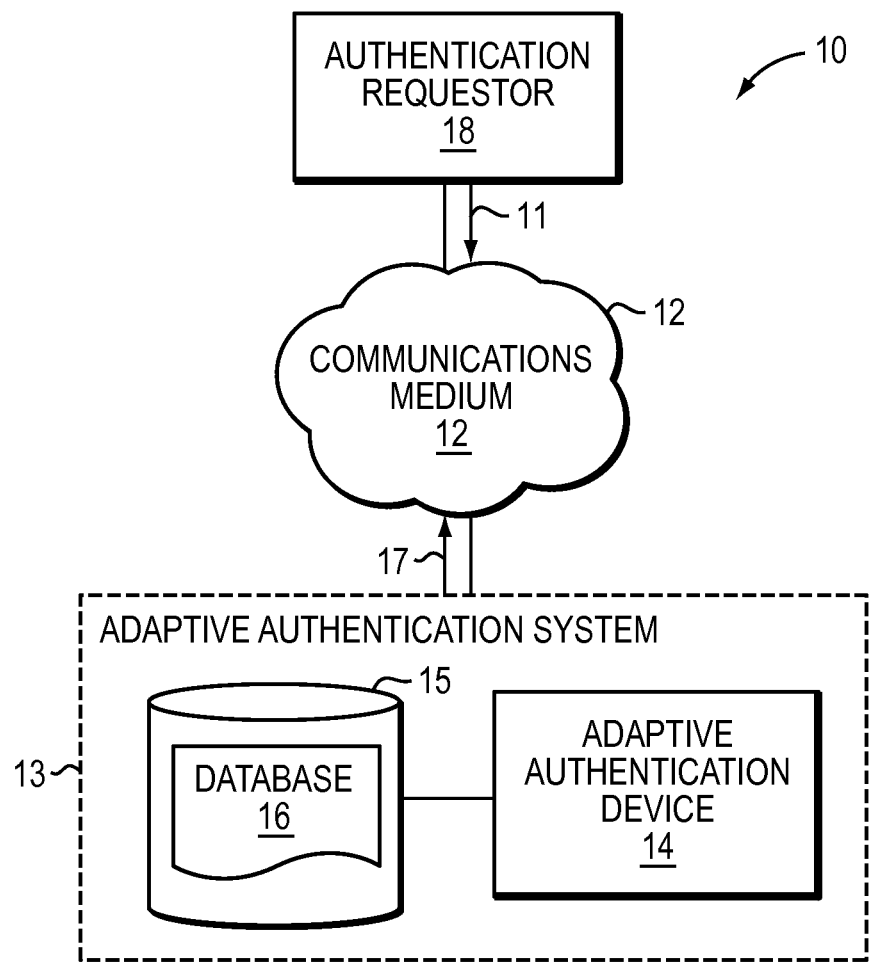
FIG. 1 is a schematic diagram illustrating an electronic environment in which the present invention can be implemented.

FIG. 1 illustrates an exemplary electronic environment 10 for carrying out the improved techniques. Electronic environment 10 includes communications medium 12, authentication requestor 18 and adaptive authentication system 13. As discussed further below, the adaptive authentication system 13 selects a suitable authentication method to be applied to a given transaction from among a plurality of available authentication methods, based on the implementation of an authentication request in connection with the transaction.

Communication medium 12 provides connections between the adaptive authentication system 13 and authentication requestor 18. The communications medium 12 may implement a variety of protocols such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Authentication requestor 18 is constructed and arranged to receive, from a user, requests to access data and send, to adaptive authentication system 13, request 11 to authenticate the user. Authentication requestor 18 is further constructed and arranged to receive an adaptive authentication result 17 which indicates whether the user is at high risk of being a fraudulent user.

Request 11 takes the form of a message that includes various facts and their values; such messages are embedded in a payload of a data packet. Request 11 typically includes a username for the user and a timestamp indicating a time.

Adaptive authentication system 13 is constructed and arranged to receive authentication request 11 from authentication requestor 18. Adaptive authentication system 13 is also constructed and arranged to generate adaptive authentication result 17 based on request 11 and a baseline profile of the user, the baseline profile including a history of requests from a user over several previous time windows. Adaptive authentication system 13 is further constructed and arranged to send adaptive authentication result 17 to authentication requestor 18. Adaptive authentication system 13 includes adaptive authentication device 14 and storage device 15.

Storage device 15 is constructed and arranged to store database 16 which contains current and baseline profiles for a user. Database 16 includes a set of entries, each entry of which includes a user identifier, a time period and user data.

Adaptive authentication device 14 is constructed and arranged to perform adaptive authentication operations on request 11 according to the improved techniques and takes the form of a desktop computer, laptop, server or tablet computer. Specifically, adaptive authentication device 14 receives request 11 from authentication requestor 18 and accesses the baseline profile having a user identifier matching the username of request 11. Further detail concerning adaptive authentication device 14 are described below with regard to FIG. 2.

Figure 2:
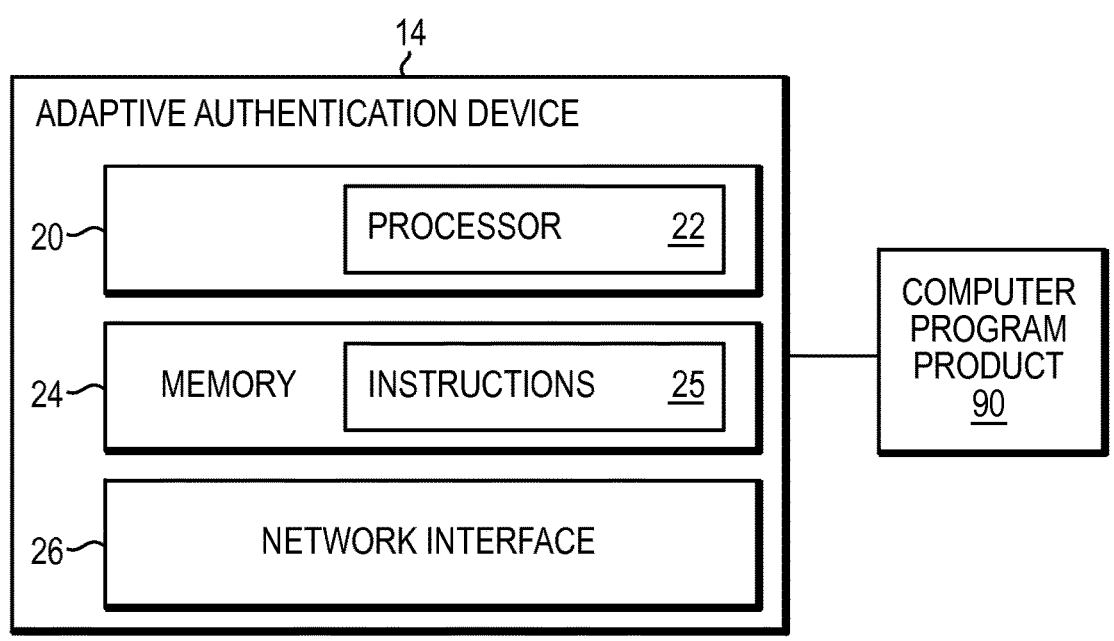
FIG. 2 is a schematic diagram illustrating an exemplary adaptive authentication device within the electronic environment shown in FIG. 1.

FIG. 2 illustrates components of adaptive authentication device 14. Adaptive authentication device 14 includes a controller 20 which in turn includes a processor 22, a memory 24 and a network interface 26.

Memory 24 is configured to store code which includes instructions 25 to process an authentication request from an authentication requestor. Memory 24 is further configured to store data from database 16 and request 11. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the instructions 25 stored in memory 24.

Network interface 26 is constructed and arranged to send and receive data over communications medium 12. Specifically, network interface 26 is configured to receive request 11 from and to send adaptive authentication result 17 to authentication requestor 18.

Returning to FIG. 1, adaptive authentication result 17 indicates a likelihood that request 11 is associated with fraudulent activity. Processor 22 generates adaptive authentication result 17 based on fact values of request 11 and user data in database 16, as discussed further below in conjunction with FIGS. 3 through 5.

During operation, authentication requestor 18 sends request 11 to adaptive authentication device 14 via network interface 26. Processor 22 stores data such as the username, fact values and timestamp from request 11 in memory 24. Processor 22 accesses database 16 to perform a lookup operation on the username; that is, processor 22 compares the username to user identifiers in each entry of database 16 and chooses those entries having a user identifier which matches the username.

The lookup operation will result in several entries from database 16, each of whose user identifiers matches the username stored in memory 24 but has user data corresponding to a time interval. The time intervals of the entries of the database that have a user identifier that matches the username of request 11 are distinct and non-overlapping. For example, while one entry has a time interval which ends at the current time and began at 12 AM the previous Sunday, another entry has a time interval which ends at 11:59 PM the previous Saturday and begins at 12 AM the Sunday prior, and so on.

Processor 22 optionally combines the fact values stored in memory 24 with the fact values in the entry of database 16 that corresponds to the current time interval. For a more detailed discussion of suitable Adaptive Authentication systems, see for example, U.S. patent application Ser. No. 13/246,937, filed Sep. 28, 2011, entitled "Using Baseline Profiles In Adaptive Authentication" and/or United States Patent Application entitled "Techniques for Authenticating Users of Massive Multiplayer Online Role Playing Games Using Adaptive Authentication," each incorporated by reference herein.

Figure 3:
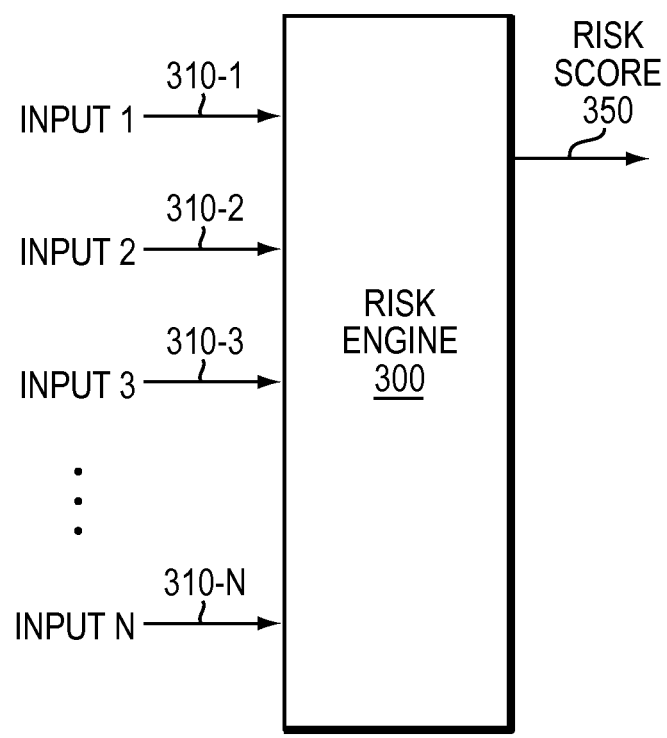
FIG. 3 illustrates an exemplary risk engine evaluating a plurality of inputs to assign a risk score to a particular transaction activity.

FIG. 3 illustrates an exemplary risk engine 300 evaluating a plurality of inputs 310 to assign a risk score 350 to a particular transaction activity, in a known manner. As shown in FIG. 3, the risk engine 300 evaluates a plurality of inputs 310 to compute the risk score 350 based on a risk model. In one embodiment, the evaluated inputs 310 can be channel specific, with one or more of the evaluated inputs 310 being specific to a mobile, web and/or Asynchronous Transfer Mode (ATM) channel. The risk engine 300 evaluates the plurality of inputs 310-1 through 310-N by assigning a weight to each input 310 in a Bayesian approach to generate the risk score 350.

For a more detailed discussion of an exemplary risk engine 300, see for example, "RSA Risk-Based Authentication," http://www.emc.com/security/rsa-securid/rsa-risk-based-authentication.htm; or RSA ADAPTIVE AUTHENTICATION. A Comprehensive Authentication & Fraud Detection, http://webobjects.cdw.com/webobjects/media/pdf/rsa/Adaptive-Authentication-Datasheet.pdf?cm_sp=RSAShowcase-_-Cat5-_-IPV, each incorporated by reference herein.

Figure 4:
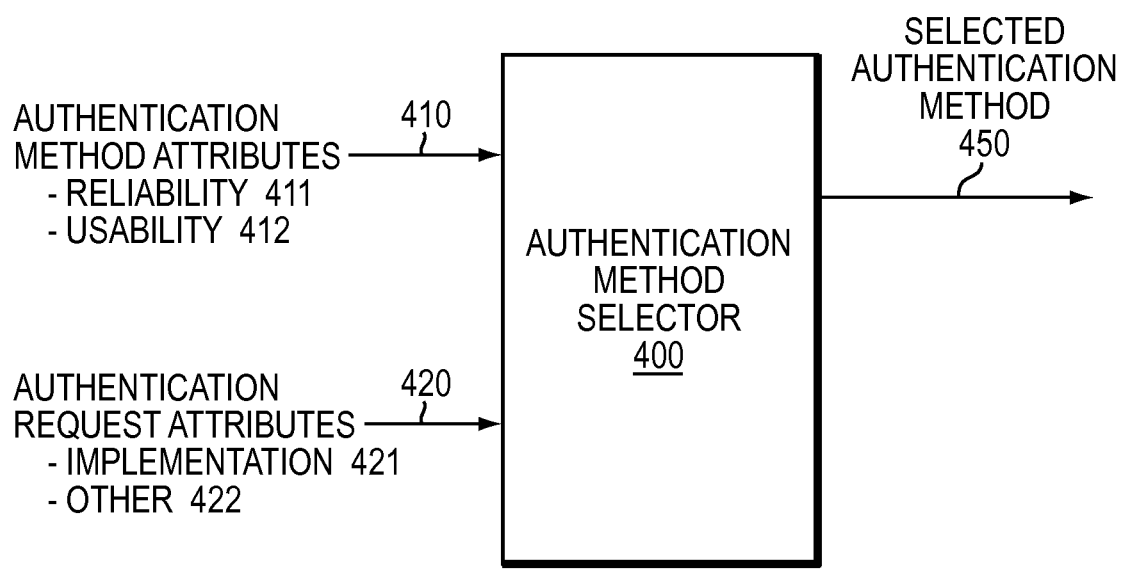
FIG. 4 illustrates an authentication method selector incorporating aspects of the present invention.

FIG. 4 illustrates an authentication method selector 400 incorporating aspects of the present invention. As shown in FIG. 4, the exemplary authentication method selector 400 selects a suitable authentication method based on attributes 410 of available authentication methods and attributes 420 of authentication request.

Authentication method attributes 410 comprise one or more reliability factors 411 that indicate how reliable the respective authentication methods are when implemented with different devices, features or applications. For example, an authentication method may require use of a camera in order to authenticate a user. The reliability factors in this example may indicate that cameras of certain smartphones are consistently more reliable that those of other smartphone manufacturers. Alternatively, the reliability factors may indicate that certain smartphone have recently been compromised indicating greater risk. As will be appreciated, similar comments will likewise apply to fingerprint scanners, retinal scanners, etc., as well as other features of smartphones or computing devices used to implement an authentication method. The comments will also apply to applications or other features deployed on such devices that are used to implement an authentication method.

Authentication method attributes 410 also comprise one or more usability factors 412 that indicate how convenient and/or effective the respective authentication methods are when performed in different working conditions. For example, following on from the example in the previous paragraph, the camera of certain smartphones may not be effective in darkness. Alternatively, some smartphones or computing devices may be less effective when performing authentication methods that require voice authentication when the user seeking authentication possesses a certain accent.

Authentication request attributes 420 relate to features associated with the authentication request 11. It should be understood from the foregoing description with respect to FIGS. 1 and 2 that the authentication request 11 may comprise certain facts and values that enable the request to be distinguished. Attributes 420 as described herein comprise implementation factors 421 that relate to how the authentication method was implemented. For example, the attributes may relate to the device, OS version, app id, sensor data, etc. Each of these attributes identifies the mode of implementation used to perform authentication. As will be appreciated, the attribute may be device-dependent such as device manufacturer or the OS used. It may refer to the sensor as used in such a device. It may also refer to an application as deployed on such a device. It should be understood that it may refer to any feature of a device used to implement the authentication method.

Authentication request attributes 420 also comprises other factors 422 suitable for facilitating selection of an authentication method. Attributes 420 may relate to user or behavioral attributes associated with the request. For example, the attributes may relate to time and location. It will be appreciated that the attributes may relate to many features associated with the request.

In one exemplary use case, the user submits a request 11 that requires authentication at the system 13. Risk engine 300 assesses the risk of the request 11 in order to determine whether to grant authentication. If the risk is low, the system 13 returns a result 17 enabling authentication. However, if the risk is high, an authentication method is selected to further challenge the user. The aim of such a challenge is to confirm the veracity of the request and consequently the identity of the user.

Upon determining to further challenge the user, the selector 400 considers the implementation attributes 421 of the authentication request 11. As discussed above, the attributes may relate to the device, or features of such a device, used to authenticate. The selector 400 proceeds to then evaluate the attributes 421 with respect to the available authentication methods. In particular, the selector 400 evaluates the attributes 421 with respect to reliability attributes 411 of the respective authentication methods. As described previously, these reliability attributes 411 may relate to devices and associated features. These attributes 411 enable identification of the most reliable and effective devices and associated features to perform the respective authentication methods. It should, however, be appreciated that the attributes 411 may be concerned with security as well as effectiveness. For example, certain devices or features may have been associated with previous fraudulent authentication requests leading to suspicion that these devices or features may have been compromised. The selector 400 ultimately ranks and/or selects a suitable authentication method based on the evaluation of the attributes 411 and 421. This enables the most suitable authentication method to be used when further challenging the user.

In at least one embodiment, the selector 400 may also consider other user and/or behavioral attributes 422 associated with the request. These attributes, for example, may relate to time. The time attribute may subsequently be evaluated with respect to the usability attributes 412 associated with the respective authentication methods. The attributes may indicate that certain devices or features associated therewith are more effective at certain times of the day. The selector will further consider this evaluation when ranking or selecting a suitable authentication method to challenge the user.

In another embodiment, the selector 400 may have access to information indicative of the user's ethnicity. This information may be provided by way of user profile or by way of the attributes 422 associated with the request 11. Either way, the selector may evaluate this information with respect to the usability attributes 412. The evaluation seeking to determine whether some authentication methods are better suited based on said evaluation. The selector 400 may also select and/or rank authentication methods based on such an evaluation.

Once the selector 400 selects the authentication method, the user is obliged to address the challenge provided by the authentication method. If the user passes the challenge, the system 13 returns a pass result 17 to the requestor 18, and authentication may be granted. If the user fails the challenge, the system 13 returns a fail result 17, and authentication may be denied.

It should be appreciated that in at least one embodiment the selector 400 rates each the available authentication methods based on previously calculated elements weights. When authentication is completed the selector 400 may receive feedback in the form of pass/fail and fraud/genuine markings. Periodically, the selector 400 may run a machine learning classifier operation on the collected data from all transactions in order to assign weights to the different elements. These weights will be used to rate authentication methods in the future.

Figure 5:
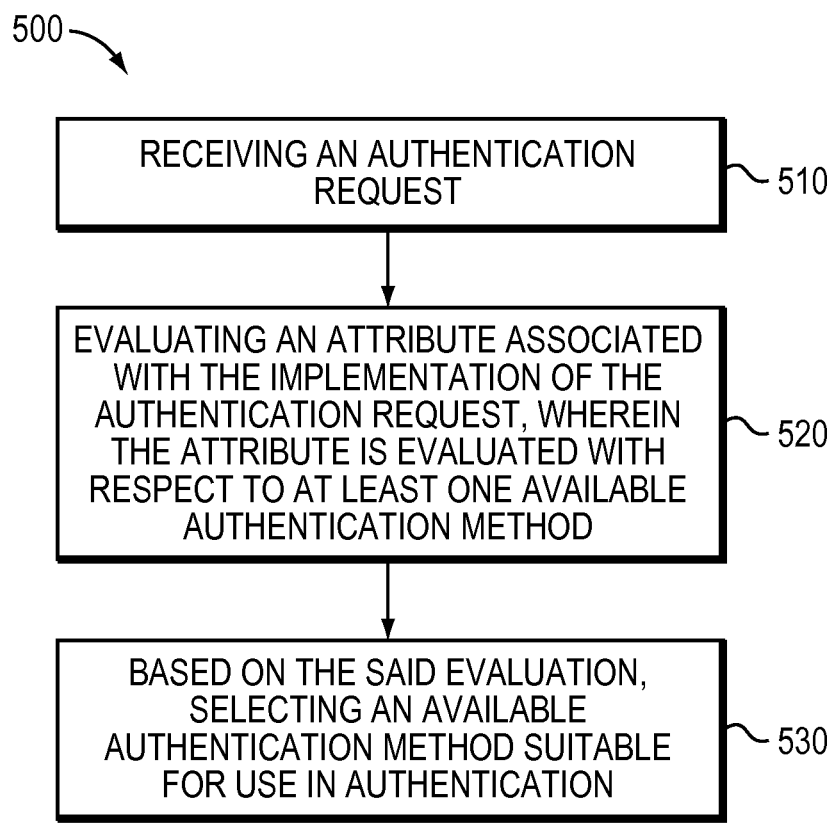
FIG. 5 is a flow chart describing an exemplary implementation of a process that incorporates aspects of the present invention.

FIG. 5 is a flow chart describing an exemplary implementation of a fraud detection process 500 that incorporates aspects of the present invention. As shown in FIG. 5, the exemplary fraud detection process 500 initially receives an authentication request during step 510 from the authentication requestor 18. The exemplary fraud detection process 500 then evaluates attribute 420 associated with the implementation of the authentication request during step 520. The attribute is evaluated with respect to at least one available authentication method. The process finally during step 530 selects an available authentication method suitable for use in authentication based on the evaluation.

Advantageously, the above solution is easy to integrate into existing authentication offerings and can give high added value to existing offerings by optimizing both usability and fraud detection. This solution enables fraud patterns to be quickly mitigated as well as improving end user experience by offering the most suitable authentication method for the user.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to an adaptive authentication device 14 that selects an authentication method from among a plurality of available authentication methods. Some embodiments are directed to a system that processes an authentication request from an authentication requestor. Some embodiments are directed to a method of processing an authentication request from an authentication requestor. Also, some embodiments are directed to a computer program product that enables computer logic to process an authentication request from an authentication requestor.

In some arrangements, adaptive authentication device 14 is implemented by a set of processors or other types of control/processing circuitry running software. In such arrangements, the software instructions can be delivered to adaptive authentication device 14 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

As mentioned previously herein, the above-described embodiments of the invention are presented by way of illustrative example only. Numerous variations and other alternative embodiments may be used.

The term "authentication information" as used herein is intended to include passwords, passcodes, answers to life questions, biometrics, or other authentication credentials, or values derived from such authentication credentials, or more generally any other information that a user may be required to submit in order to obtain access to an access-controlled application. Although the illustrative embodiments are described herein in the context of adaptive authentication, it is to be appreciated that the invention is more broadly applicable to any other type of authentication system.

The illustrative embodiments of the invention as described herein provide an improved authentication of users of authentication systems. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with other types of time authentication information and other types of access-controlled resources. Also, the particular configuration of system elements shown in the figures and their interactions may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method, comprising:
   receiving an authentication request for a device attempting to connect to a network communications system;
   assessing, by a risk engine, a risk score associated with the authentication request;
   if the risk engine determines the risk score indicates potential fraudulent activity associated with the authentication request, evaluating, by an authentication method selector, the authentication request by evaluating an attribute associated with implementation of the authentication request, wherein the attribute is evaluated with respect to at least one available authentication method, wherein the attribute comprises a mode of implementation used to perform authentication; and
   based on the said evaluation, selecting, by the authentication method selector, an available authentication method suitable for use in authenticating the device in the network communications system.

2. The method as claimed in claim 1, where the attribute comprises a device-based feature used to implement the authentication request; and
   evaluating the attribute, comprises:
   determining the reliability of the device-based feature with respect to at least one available authentication method; and
   based on the reliability, selecting the available authentication method suitable for use in authentication.

3. The method as claimed in claim 2, wherein the reliability is dependent on the success or failure of previous authentication requests comprising the device-based feature.

4. The method as claimed in claim 2, wherein the device-based feature relates to at least one of a device, an operating system, a sensor or an application.

5. The method as claimed in claim 1, wherein a second attribute is associated with the authentication request, and the method further comprises:
   evaluating the second attribute with respect to the at least one authentication methods; and
   based on the said evaluation, determining the usability of the at least one authentication methods.

6. The method as claimed in claim 5, wherein the selection of the available authentication method is based on the usability.

7. An apparatus, comprising:
   a memory; and
   at least one hardware device, coupled to the memory, operative to:
   receive an authentication request for a device attempting to connect to a network communications system;
   assess, by a risk engine, a risk score associated with the authentication request;
   if the risk engine determines the risk score indicates potential fraudulent activity associated with the authentication request, evaluate, by an authentication method selector, the authentication request by evaluating an attribute associated with implementation of the authentication request, wherein the attribute is evaluated with respect to at least one available authentication method, wherein the attribute comprises a mode of implementation used to perform authentication; and
   based on the said evaluation, select, by the authentication method selector, an available authentication method suitable for use in authenticating the device in the network communications system.

8. The apparatus as claimed in claim 7, where the attribute comprises a device-based feature used to implement the authentication request; and
   evaluating the attribute, comprises:
   determining the reliability of the device-based feature with respect to at least one available authentication method; and
   based on the reliability, selecting the available authentication method suitable for use in authentication.

9. The apparatus as claimed in claim 8, wherein the reliability is dependent on the success or failure of previous authentication requests comprising the device-based feature.

10. The apparatus as claimed in claim 8, wherein the device-based feature relates to at least one of a device, an operating system, a sensor or an application.

11. The apparatus as claimed in claim 7, wherein a second attribute is associated with the authentication request, and the apparatus further operative to:
evaluate the second attribute with respect to the at least one authentication methods; and
based on the said evaluation, determine the usability of the at least one authentication methods.

12. The apparatus as claimed in claim 11, wherein the selection of the available authentication method is based on the usability.

13. A computer program product comprising a tangible non-transitory machine-readable storage medium having encoded therein executable code of one or more software programs, wherein the one or more software programs when executed perform the steps of:
receiving an authentication request for a device attempting to connect to a network communications system;
assessing, by a risk engine, a risk score associated with the authentication request;
if the risk engine determines the risk score indicates potential fraudulent activity associated with the authentication request, evaluating, by an authentication method selector, the authentication request by evaluating an attribute associated with implementation of the authentication request, wherein the attribute is evaluated with respect to at least one available authentication method, wherein the attribute comprises a mode of implementation used to perform authentication; and
based on the said evaluation, selecting, by the authentication method selector, an available authentication method suitable for use in authenticating the device in the network communications system.

14. The computer program product as claimed in claim 13, where the attribute comprises a device-based feature used to implement the authentication request; and
evaluating the attribute, comprises:
determining the reliability of the device-based feature with respect to at least one available authentication method; and
based on the reliability, selecting the available authentication method suitable for use in authentication.

15. The computer program product as claimed in claim 14, wherein the reliability is dependent on the success or failure of previous authentication requests comprising the device-based feature.

16. The computer program product as claimed in claim 14, wherein the device-based feature relates to at least one of a device, an operating system, a sensor or an application.

17. The computer program product as claimed in claim 13, wherein a second attribute is associated with the authentication request, and
wherein the one or more software programs when executed also perform the steps of:
evaluating the second attribute with respect to the at least one authentication methods; and
based on the said evaluation, determining the usability of the at least one authentication methods.

18. The computer program product as claimed in claim 17, wherein the selection of the available authentication method is based on the usability.

\* \* \* \* \*